Dec. 23, 1941.   J. S. REID   2,266,801
COMBINATION SEALING STRIP AND GARNISH MOLDING
Filed Aug. 3, 1940   2 Sheets-Sheet 1

INVENTOR
JAMES S. REID
BY
Hyde and Meyer
ATTORNEYS

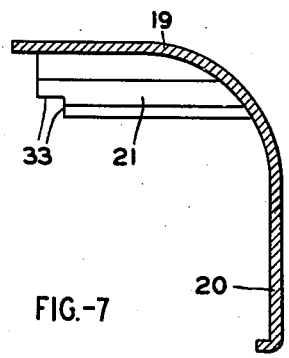
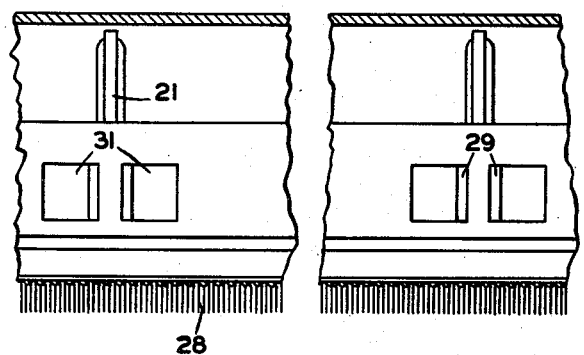
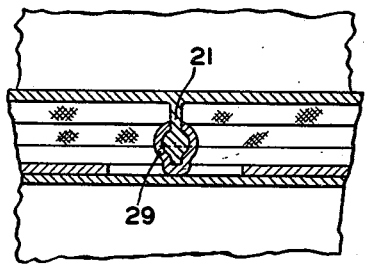
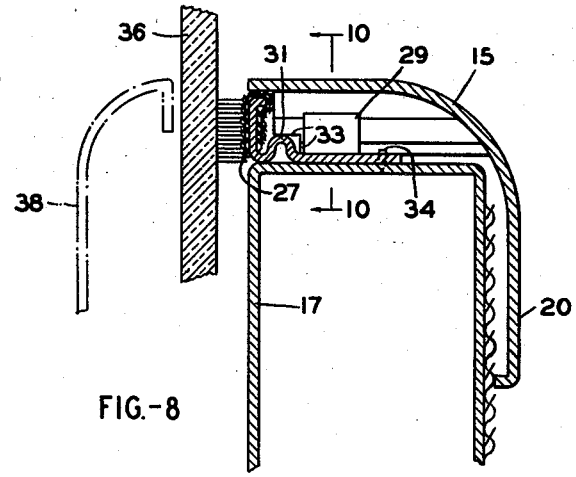
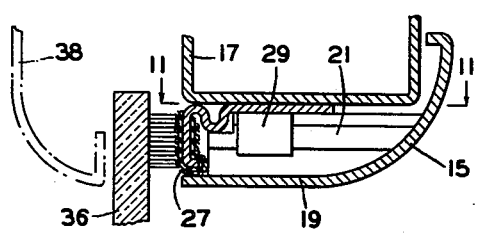
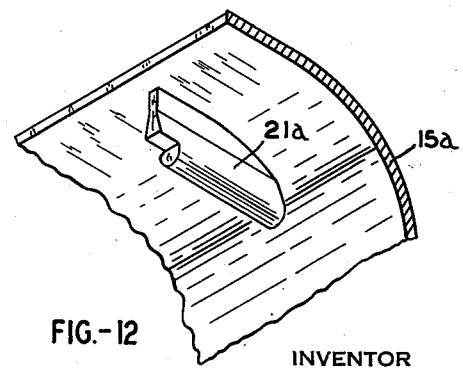

Patented Dec. 23, 1941

2,266,801

UNITED STATES PATENT OFFICE 2,266,801

COMBINATION SEALING STRIP AND GARNISH MOLDING

James S. Reid, Shaker Heights, Ohio, assignor to The Standard Products Company, Port Clinton, Ohio, a corporation of Ohio Application August 3, 1940, Serial No. 350,208

8 Claims. (Cl. 296—44)

The invention relates to trim moldings for window openings and to weather strip sealing means associated therewith. It is particularly directed to structural elements for a combined trim molding and sealing strip adapted to be conveniently assembled in a vehicle window opening.

In the construction of modern passenger vehicles it is extremely desirable that the parts thereof which are usually exposed to view should present a smooth, streamlined surface and pleasing appearance without sacrifice of sound construction and adequate resistance to mechanical stresses and strains. It is also desirable that the interstices between window panes and the body structure within which they are moved should be efficiently cushioned and insulated against vibration and the entry of air currents and rain.

Trim moldings of pleasing appearance and adequate physical properties made from organic plastic material have recently been developed and are rapidly coming into commercial use. Since in many of their characteristics they vary essentially from the former constructions of wood and metal, considerable research has been devoted to developing methods of adaptation and design best suited to their particular properties.

It is an object of the present invention to provide a novel structure comprising a trim molding and a sealing strip, organized as a unit for application to or assembly in a vehicle window frame.

It is a further object to provide improved means for removably attaching a resilient sealing strip to a trim molding.

It is a further object to improve the method of assembly by a practice wherein a sealing strip is first applied to a vehicle window aperture, and a trim molding is thereafter removably attached to said sealing strip.

Yet a further object is the provision of an improved mode of assembly whereby a trim molding is first detachably secured to a sealing strip, and the unitary or composite strip and molding is thereafter inserted in said window aperture.

Further objects and advantages will be apparent from the accompanying disclosure as illustrated in preferred form in the attached drawings, in which Fig. 1 is an elevation, viewed from a vehicle interior, of a trim molding in position in a window opening.

Fig. 7 is a section taken on the line 7—7 of Fig. 2.

Fig. 8 is a section taken on the line 8—8 of Fig. 1.

Fig. 9 is a section taken on the line 9—9 of Fig. 1.

Fig. 10 is a section taken on the line 10—10 of Fig. 8.

Fig. 11 is a section taken on the line 11—11 of Fig. 9.

Fig. 12 shows a modified form connector projection similar to that shown in Fig. 5.

Figure 1:
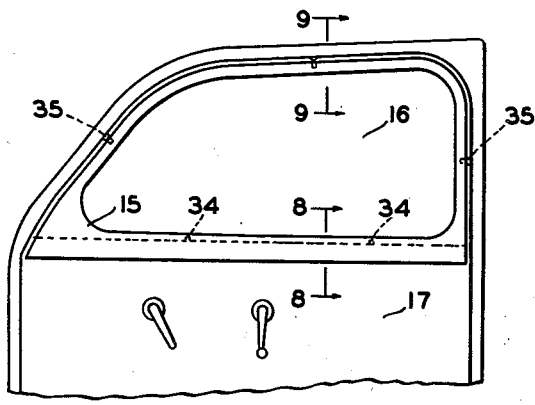

The elements of my novel structure, now to be described in preferred form, comprising a vehicle body structure, a decorative trim molding, and a sealing strip positioned generally therebetween, but in my adaptation of the structure to specific vehicle types I may vary the method of assembly somewhat without detracting from the advantages thereby secured. I may first attach the sealing strip to the trim molding and thereafter fit the assembly into a vehicle window opening, or I may first attach the sealing strip to the vehicle body, and then superpose the trim molding upon the sealing strip. In either embodiment the sealing strip, in final position, is securely but removably attached to the vehicle structure, and the trim molding is securely, but optionally removably attached to the sealing strip. Trim moldings of organic plastic material are readily adaptable to the structural design disclosed herein since they are pliable, relatively yieldable, exhibit adequate physical properties, and have an unusually pleasing appearance. By reason of their exceptional resiliency they can be accommodated to minor inaccuracies of construction frequently encountered in vehicle body construction. As a specific material for trim moldings I prefer to use a cellulose organic acid ester such as cellulose acetate butyrate. The use of organic plastic material of this type permits the fabrication of the complete trim molding in a pressure molding operation in manner now known to the art.

As shown for instance in Figs. 1, 2, 8 and 9, a trim molding 15 surrounds, or frames, the interior periphery of a window aperture 16 of a body structure 17 here shown as a vehicle door. In the present preferred embodiment the molding is illustrated in Fig. 8 as having a generally right angular sectional contour and having a flange portion 19 which in assembled position extends outwardly through the window aperture and a second flange portion 20 substantially at right angles to flange 19, and extending in a plane generally parallel to the interior wall 18 of the vehicle, or generally vertically, as shown in Fig. 8. The principal function of the trim molding is to serve as a cover and shield for the sealing means, soon to be described, and to substitute a desirable streamlined appearance for somewhat unsightly structural detail such as appears beneath the molding in Fig. 8.

Figure 3:
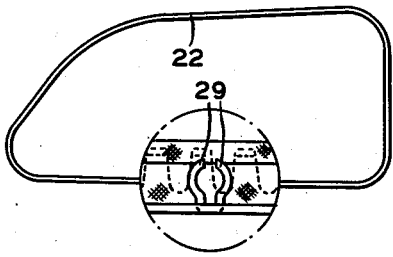
Fig. 3 is an elevation of a sealing strip, the portion in the dot-dash circle being enlarged to show the structural detail. When in operative position in the window opening the sealing strip is concealed, being shielded by the trim molding.
Figure 2:
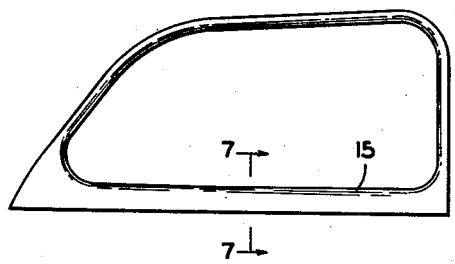
Fig. 2 is a similar view of a trim molding removed from the window opening.
Figure 6:
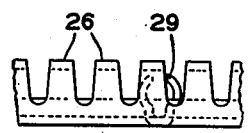
Fig. 6 is a view in vertical elevation of a portion of a sealing strip backbone member, viewed in the direction of the arrows shown in Fig. 4.

Integrally formed ribs or projections 21 are spaced at suitable intervals along the internal surface of flange 19 and may be of any suitable shape to fit, in male-and-female clamping arrangement, a cooperating element or elements on a sealing strip hereinafter described. Said sealing strip, indicated in final form by the numeral 22 in Fig. 3 is built up from a steel backbone or strengthening member 23, best shown in Figs. 4 and 6. Member 23 may take any convenient shape, depending on the contours of the trim molding and the vehicle body. It is preferably fabricated as a continuous, straight strip and is formed to the proper length and contour to fit the window opening with which it is associated, positioned generally between the molding and the body, as seen in section in Figs. 8 and 9.

In the preferred embodiment here shown the member 23 is formed with two flanges 24 and 25, substantially at right angles to each other, the flange 24 being provided with bent serrations or teeth 26 to permit subsequent undistorted bending and to better retain thereon a resilient rubber compound 27, Figs. 8 and 9, to which a fabric bearing a pile surface 28 may be attached. The particular arrangement of the rubber or fabric, or the absence of one or other of these elements is not critical, it being understood that any known resilient weather sealing component may be carried by flange 24.

Figure 4:
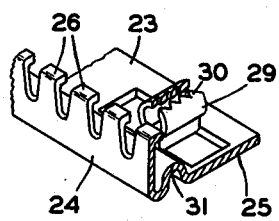
Fig. 4 is a perspective view, partly in section, of a portion of sealing strip backbone, such as is shown in elevation in Figs. 3 and 6.
Figure 5:
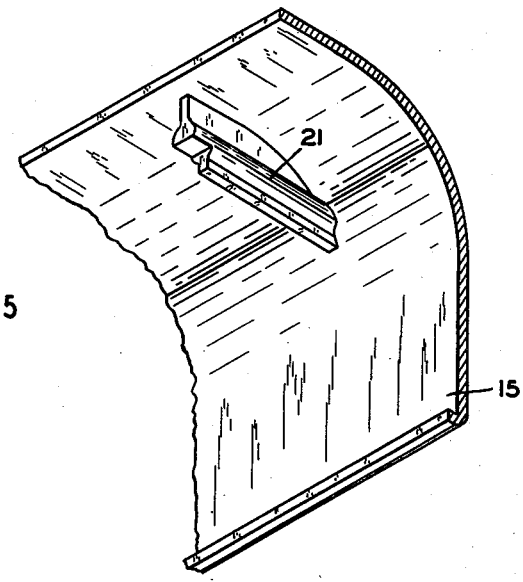
Fig. 5 is a perspective view of the trim molding, showing its interior design.

Flange 23 of the steel backbone member has integrally formed therewith clamping members or lugs 29 at spaced points corresponding with the projections 21 on the associated trim molding. These clamping members may be conveniently formed by a stamping operation involving turning inwardly portions of the material of the backbone member, as shown in Fig. 4. They may be provided with gripping teeth 30 if a relatively inseparable union is desired between molding and strip. The steel strip may also be formed with a strengthening rib, 31, running longitudinally on the strip.

Considering first the operations involved when trim molding and sealing strip are assembled before attachment to the vehicle body, the sealing strip is inserted within the trim molding so that the clamping lugs 29 on the sealing strip fit closely over the projections 21 on the molding. A sliding friction fit may suffice, but a more permanent union can be secured for example by inserting the jaws of a pliers in the apertures 31, Fig. 11, and clamping the lugs tightly around the projections. In the preferred embodiment shown, a snug fitting assembly is obtained when the strengthening rib 31 seats against the angular abutments 33 on the trim molding projection 21, as seen for instance in Figs. 7 and 8.

The composite molding and sealing strip may now be inserted in the window aperture by first moving its lower portion inwardly and downwardly over hooks or projections 34, shown in dotted lines in Figs. 1 and 8, then swinging the sides and upper portions into final position and securing the assembly in place by screws 35 which pass through the body structure.

As an alternative method of assembly the sealing strip may first be permanently secured to the body structure, for instance by screws or rivets, and the trim molding finally slid into position in a tight friction fit with the clamping lugs 29 sliding into engagement with the projections 21. While such a method does not provide as permanent an arrangement as the first described process, it provides more rapid access to the sealing strip at any subsequent time, and facilitates replacement of the molding.

Figs. 8 and 9 illustrate the completed assembly shown in section at the lower and upper window sills respectively. The window 36 is movable vertically in an interstitial space between inner and outer body portions 17 and 38 respectively. For clarity of illustration the space between the glass and the member 17 is somewhat exaggerated to plainly show the pile and resilient base carried by the steel element of the sealing strip. The outer wall portion 38, indicated only by dot-and-dash lines, may be wholly of wood or metal, or may carry a molding and sealing strip assembly of some form, but preferably of the type hereinabove disclosed.

The construction herein described, and claimed in the appended claims, is characterized by a simplicity of assembly, ease of fabrication, and reduction to a minimum of the necessary co-operating elements. The molding, as made from organic plastic material, can be readily manufactured in any solid color, or in any one of a variety of pleasing color combinations which persist throughout the material so that the molding is free from the irritating consequences of chipping and scratching encountered with wood or metal moldings.

Obvious modifications of the clamping arrangement for attaching the sealing strip to the trim molding will occur to those skilled in the art. For instance the male member of the clamp, hereinabove described as being integral with the trim molding, may be formed on the sealing strip and the female member may be a part of the trim molding. Other such modifications are likewise possible, and are included within the scope of the appended claims.

What I claim is:

1. In a vehicle body having a window opening, a window pane movable with relation to said body to close said opening, resilient sealing means attachable to said body and extending around said opening and yieldably bearing against said window pane when attached to said body, and a garnish molding of organic plastic material removably attached to said sealing means.

2. In a vehicle body having a window opening, a window pane movable with relation to said body to close said opening, resilient sealing means attached to said body and extending around said opening and yieldably bearing against said window pane, and a garnish molding of organic plastic material removably attached to said sealing means.

3. In a vehicle body having a window opening, a window pane movable with relation to said body to close said opening, resilient sealing means attachable to said body and extending around said opening and yieldably bearing against said window pane when attached to said body, a garnish molding of organic plastic material adapted to frame said window opening, cooperating elements respectively secured to said garnish molding and said sealing means and disposed to attach said sealing means to said garnish molding, and means for attaching said sealing means to said body in the neighborhood of said opening.

4. In a vehicle body having a window opening, a window pane movable with relation to said body to close said opening, resilient sealing means attached to said body and extending around said opening and yieldably bearing against said pane, a garnish molding of organic plastic material adapted to frame said opening, and cooperating elements respectively secured to said garnish molding and said sealing means and disposed to attach said garnish molding to said sealing means.

5. In a vehicle having a window opening, a window pane movable with relation to said body to close said opening, resilient sealing means attached to said body and extending around said opening and yieldably bearing against said pane, a garnish molding of organic plastic material adapted to frame said opening, and cooperating elements comprising a male and female clamp assembly respectively secured to said garnish molding and said sealing means and disposed to attach said garnish molding to said sealing means.

6. In a vehicle body having a window opening, a window pane movable with relation to said body to close said opening, resilient sealing means attachable to said body and extending around said opening and yieldably bearing against said window pane when attached to said body, a garnish molding of organic plastic material adapted to frame said window opening, cooperating elements comprising a male and female clamp assembly respectively secured to said garnish molding and said sealing means and disposed to attach said sealing means to said garnish molding, and means for attaching said sealing means to said body in the neighborhood of said opening.

7. In a vehicle body having a window opening, a window pane movable with relation to said body to close said opening, resilient sealing means attachable to said body and extending around said opening and yieldably bearing against said window pane when attached to said body, a garnish molding of organic plastic material adapted to frame said window opening, cooperating elements respectively integral with said garnish molding and said sealing means and disposed to attach said sealing means to said garnish molding, and means for attaching said sealing means to said body in the neighborhood of said opening.

8. In a vehicle body having a window opening, a window pane movable with relation to said body to close said opening, resilient sealing means attached to said body and extending around said opening and yieldably bearing against said pane, a garnish molding of organic plastic material adapted to frame said opening, and cooperating elements respectively integral with said garnish molding and said sealing means and disposed to attach said garnish molding to said sealing means.

JAMES S. REID.